No. 867,087. PATENTED SEPT. 24, 1907.
A. F. TIDWELL.
COTTON ELEVATING, CONVEYING, AND CLEANING APPARATUS.
APPLICATION FILED JULY 6, 1906.
2 SHEETS—SHEET 2.
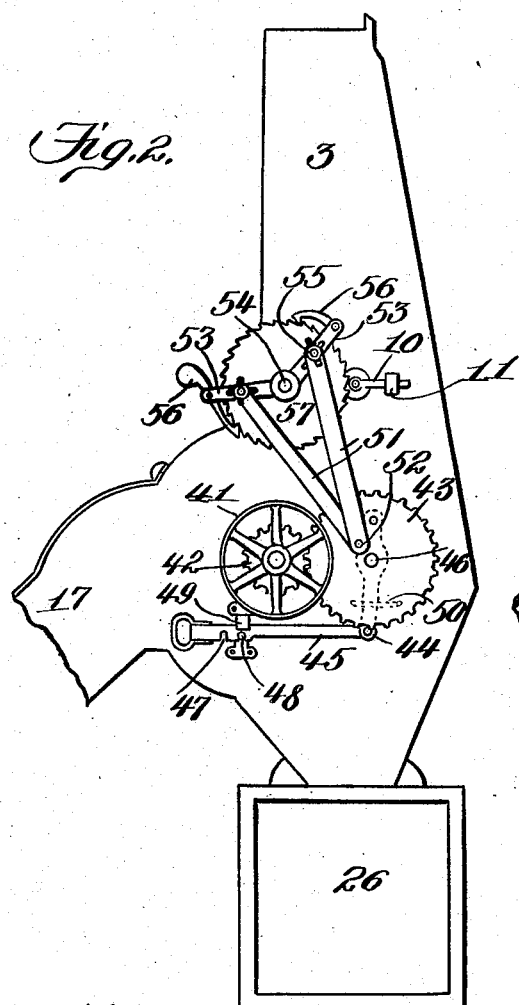
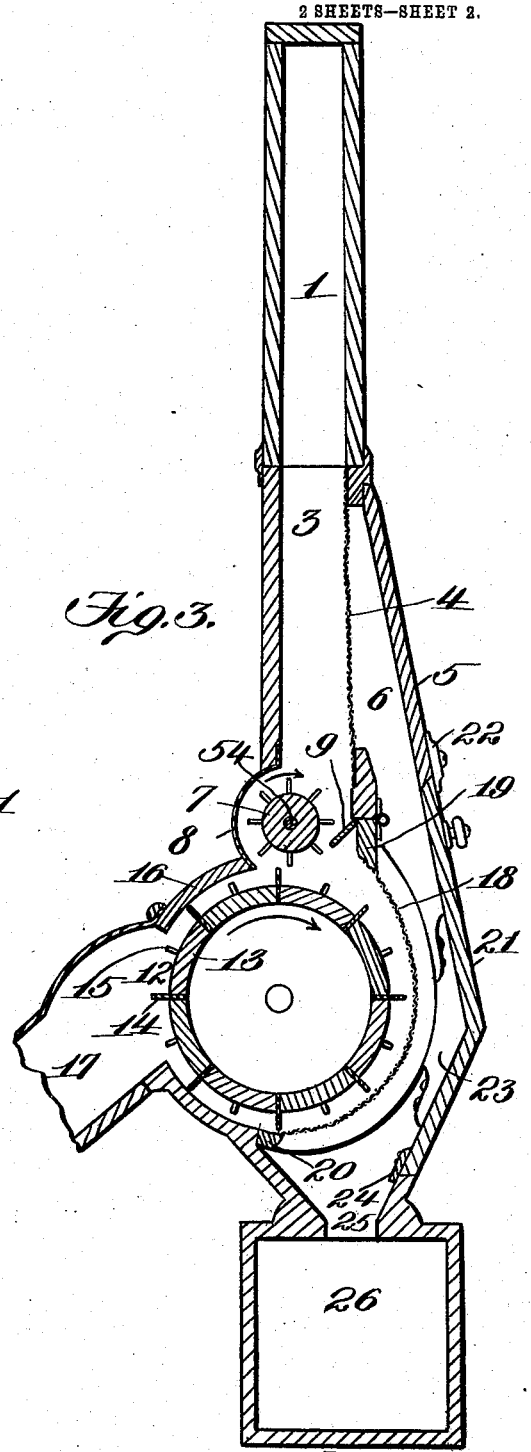

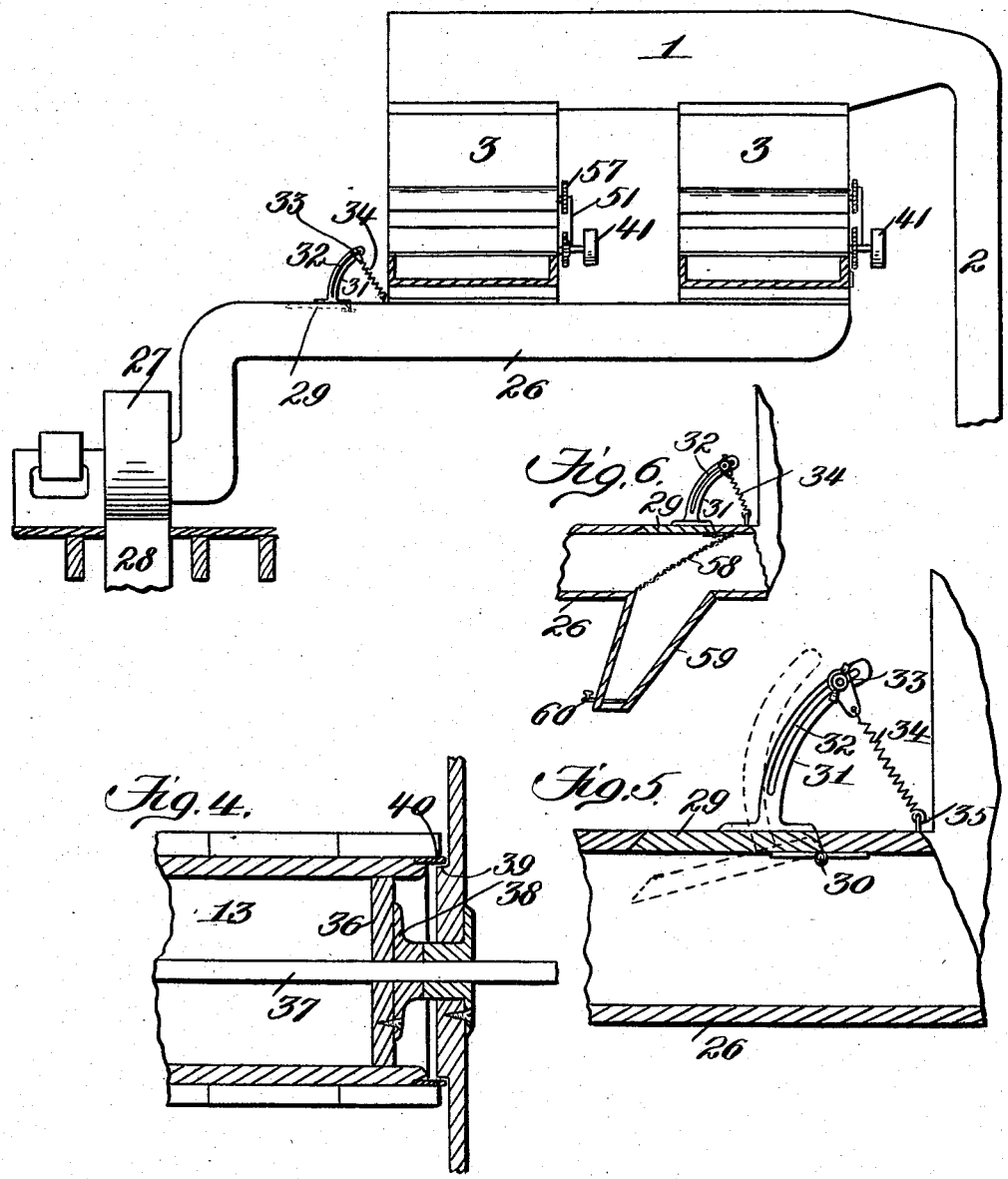

UNITED STATES PATENT OFFICE.

ALBERT F. TIDWELL, OF CELINA, TEXAS.

COTTON ELEVATING, CONVEYING, AND CLEANING APPARATUS.

No. 867,087.  Specification of Letters Patent.  Patented Sept. 24, 1907.

Application filed July 6, 1906. Serial No. 325,039.

*To all whom it may concern:*

Be it known that I, ALBERT F. TIDWELL, a citizen of the United States, residing at Celina, in the county of Collin and State of Texas, have invented new and useful Improvements in Cotton Elevating, Conveying, and Cleaning Apparatus, of which the following is a specification.

This invention relates to a cotton elevating, conveying and cleaning apparatus from which the seed cotton is fed to a gin or gins in an improved condition, and whereby the handling of the seed cotton is rendered more simple, economical and expeditious.

One object of the invention is to provide a comparatively simple apparatus, including elevating and conveying mechanism for seed cotton and positive means for separating and removing dust, leaf trash and other impurities before the cotton is fed to the gin, and thus relieve the latter of wear and tear to a material extent and prolong its period of useful service, as well as hasten the operation of cleaning and ginning cotton and produce a superior product.

The improved apparatus fully relieves the cotton of all dirt, grit, and other foreign matters, so that when the cotton reaches the gin it contains nothing but the seed, and a portion of the latter is removed when the cotton passes through the cleaning apparatus.

The improved apparatus is also provided with novel means for gaining access to the interior thereof, and also mechanism for rendering the parts both positive and reliable in their operation, as well as details of construction contributing to render the complete organization effective for the purpose for which it has been devised.

In the drawings, Figure 1 is a front elevation of an apparatus embodying the features of the invention. Fig. 2 is an end elevation thereof. Fig. 3 is a section through a portion of the apparatus. Fig. 4 is an enlarged sectional view of a portion of the apparatus particularly showing the cleaning drum. Fig. 5 is a sectional elevation of a part of the air trunk or conduit showing an automatic valve in connection therewith. Fig. 6 is a view similar to Fig. 5 showing a slight modification in the construction.

Similar numerals of reference are employed to indicate corresponding parts in the several views.

The numeral 1 designates an air passage, terminating at one end in a suction conduit or trunk 2, which may extend away any distance from the apparatus and be located exterior of a building for convenience in disposing a wagon or other vehicle thereunder loaded with cotton in a rough or crude state as it comes from the field. The suction trunk 2 may in some instances be directed or extended to a storage building. The air passage 1 is disposed over and communicates with receiving chambers 3, which are shown in the present instance as two in number, but may be increased or decreased. The receiving chambers 3 are divided by vertical foraminous partitions or wire screens 4, one in each, the rear of the casing, as at 5, being so shaped by extending the same back at an angle of inclination as to provide air spaces 6 of considerable area in rear of the screens. The upper and lower terminals of the screens are fixed to rails $18^a$ and $18^b$ to portions of the casing, and the main or cotton receiving chambers have unobstructed communication with the air chamber 1 and are also vertically straight, the screens 4 being approximately parallel with the front walls of the casing. At the lower terminations of the receiving chambers 3, spiked feed cylinders 7 are disposed and have a slow movement through the medium of mechanism which will be hereinafter set forth. The front wall of the casing at the points of location of the feed cylinders 7, are spherically projected, as at 8, so as to bring the said cylinders forward and provide a throat in connection with the base of each receiving chamber large enough to render the feed cylinders practical in forcing the cotton downwardly by a step by step movement without liability of choking the throats at the lower terminals of the receiving chambers.

In each throat between an interior part of the casing and the adjacent feed cylinder 7, is an automatically operating check valve, consisting of a gate 9, which is normally disposed in a horizontal plane and connected to an exteriorly located counterbalancing arm 10, having thereon a counterbalancing weight 11. Below each feed cylinder 7 is a cleaning chamber 12, having a cleaning drum 13 disposed therein and provided with radially projecting alternately arranged blades and spikes or teeth 14 and 15 at the periphery thereof. The blades 14 are constructed of flexible material so that they may readily yield when the drum 13 rotates and the said blades come in contact with the cotton. This cleaning drum with its blades and teeth occupies the greater portion of the cleaning chamber 12, the front of the chamber being provided with segmental air guards or shields 16, extending to an outlet chute 17, adapted to communicate directly with a gin. The air space 6 formed by the foraminous partition or screen 4 extends downwardly back of the cleaning drum 13, the latter being separated from said space by an arcuate screen or partition 18 connected at its upper end to a hinged member or rail 19, secured to the rail $18^b$ and at its lower terminal having a supporting rail 20. The rear portion of the casing adjacent to the arcuate screen or partition 18 is bulged rearwardly and constructed as a door 21, held in place when closed by suitable buttons 22, said door being intermediately connected by braces 23 extending across the angular intersecting portions thereof, and at its lower end abutting against an inner stop or shoulder 24. By removing this door 21 the arcuate screen 18 is made accessible, and the latter may be swung outwardly through the opening cleared by the door to render the cleaning drum accessible for repair or other purposes.

Below each cleaning drum the casing is contracted to provide a hopper-shaped outlet 25, which communicates with the top of a dust or suction box or trunk 26, leading directly to a suction fan 27, provided with an exhaust 28. This suction fan will be operated by suitable mechanism, and may be of any preferred construction. The lower dust or suction box 26 projects some distance beyond one end of the apparatus, and in the top thereof, as clearly shown by Fig. 5, an automatically operating inwardly opening valve 29 is provided and consists of a door hinged, as at 30, and provided with an upwardly extending segmental arm 31, having a longitudinal slot 32 therein engaged by an adjusting nut and head 33, to which the upper end of a spring 34 is attached, the lower end of said spring being secured to the top of the box, as at 35. The object of this valve 29 is to relieve the fan when the receiving chamber becomes fully charged with cotton, and the suction current is materially intercepted so as to obviate any cessation of regularity of movement or rotation of the said fan and an impairment of any part of the apparatus which might occur if there was no relief. By adjusting the spring 34, the degree of sensitiveness of operation of the valve 29 may be modified, it being understood that under ordinary conditions the said valve will remain closed and be so held by the tension of the spring 34. The valve 9 prevents too rapid feed of the cotton downwardly to the cleaning drum 13 by the feed cylinder 7, and when the parts of the machine are at rest this valve is automatically closed and the cotton is held thereby above the drum.

The cleaning drum is constructed at opposite extremities, as clearly shown by Fig. 4, the heads 36 being set inwardly from the adjacent terminals of the surrounding shell of the drum and centrally penetrated by a driving shaft 37, to which sleeves 38, secured against the outer surface of the heads, are firmly fixed by the medium of set screws, as clearly shown. The casing adjacent to the drum heads is suitably grooved or offset, as at 39, to receive the free extremities of flexible strips 40, secured on the ends of the surrounding shell to insure the formation of an air-tight joint between the said drum and casing and prevent the cotton from working down between the ends of the drum and the casing and insure the out-drawing of all of the dust and dirt through the arcuate screen or partition 18.

The drum 13, as clearly shown by Fig. 2, has on one end of the shaft thereof exterior of the casing, a pulley 41, which is belted to the gin, each cleaning drum being similarly actuated. Each pulley 41 carries a pinion 42 to mesh with a spur gear 43, carried by an angular or bracket arm 44 of an adjusting bar or lever 45, said arm 44 carrying a central stud 46 on which the spur gear has rotative movement. The angular or bracket arm 44 is pivoted at its upper end to the adjacent portion of the casing and has its lower end free to swing. The adjusting bar or lever 45 has a suitable grip at its free end and is notched, as at 47, to receive a locking pin or projection 48, held on a guide 49, through which the bar has movement. The spur gear 43 is restricted in its movement in opposite directions by the angular bracket arm 44, which has its lower extremity extending through a stop 50, as shown by dotted lines in Fig. 2, said clip being located below the stud 46. By operating the lever or bar 45 rearwardly and forwardly, the spur gear 43 may be thrown out of or into engagement with the pinion 42. Connecting rods or bars 51 are eccentrically attached to the center of the spur gear 43 through the medium of a suitable wrist pin 52, the upper ends of these connecting rods being adjustably held in connection with longitudinally slotted arms 53, radiated from the projecting end of the shaft 54 of the feed cylinder 7, the extremities of the rods or bars 51 engaging these arms being held in positively adjusted position through the medium of suitable thumb nuts or analogous devices 55. On the outer ends of the arms 53, weighted pawls or dogs 56 are intermediately fulcrumed and are held in continual engagement with the teeth of a ratchet wheel 57, fixed on the shaft 54. Through the medium of this ratchet wheel and the pawls or dogs 56 and connecting rods 51, a step by step or slow feed may be imparted to the feed cylinder 7, it being obvious that the speed of rotation of the feed cylinder may be varied by adjusting the connecting rods 51 on the arms 53.

From the foregoing description, it will be seen that the rotation of the pulley 41 causes a corresponding movement of the spur gear 43 through the medium of the pinion 42 when said spur gear is in mesh with the pinion, and the motion of the spur gears is transmitted through the connecting rods 51 and arms 53 to the pawls or dogs 56 which actuate the ratchet wheel 57 and impart to the feed cylinder a comparatively slow rotation. There will be times when the movement of the feed cylinder is unnecessary, and under these conditions the spur gear 43 will be thrown out of mesh from the pinion 42 and permit the cleaning drum to continue its rotation with obvious advantages in the operation of the apparatus.

The fan 27 is set in motion and creates a suction through the apparatus, and the cotton is drawn through the suction pipe or conduit 2 and passes to the air chamber 1, from whence it is drawn down into the receiving chambers 3, and as the feed cylinders and cleaning drums are simultaneously set in motion, the cotton from the receiving chambers will be gradually fed downwardly to the cleaning drums and taken up by the latter and thoroughly separated to permit the air to fully permeate the same and remove the major portion of the dirt and grit carried thereby. As the cotton passes down into the receiving chambers, it washes over the screen partitions 4 and a portion of the grit and dirt is drawn therefrom into the air spaces 6, and is carried down into the dust or suction box 26. As the cotton is separated and carried around by the cleaning drums 13, the air again comes into operation through the arcuate screens or partitions 18, and the greater portion of the grit and dirt, and in point of fact all of the foreign substance that may be carried by the cotton, is removed, with the exception of the seed that may closely adhere and can only be practically handled when the cotton finally arrives in the gin. The cotton carried around by the cleaning drums is drawn through the outlets 17 and passes into the gin connected thereto, where the final treatment ensues. During the feeding of the cotton from the receiving chambers 3 by the feed cylinders 7, the check valves 9 will be operating or alternately opening and closing in accordance with the pressure brought to bear thereon and also in view of the provision of the spiked teeth of said feed cylinders. The check valves 9 also serve as press boards and insure a deposit of the cotton moving thereover at the most effective point on the cleaning drums. The air passage or chamber 1 may have as many chutes or suction pipes 2 applied thereto as desired, and disposed at any angle, and furthermore, the proportions and dimensions of the several parts may be modified at will.

As shown by Fig. 6 the dust or suction box or trunk 26 has the same valve 29 and arm and spring coöperating therewith as in Fig. 5; but in addition a diagonal screen 58 is disposed under the valve and within the suction box or trunk, and under this screen is a hopper-shaped outlet 59 with a cut-off 60 in the lower end. This modified construction is for the purpose of trapping the dirt if it is undesirable to have it pass through the fan. This modified construction may be used in place of that shown by Fig. 5 whenever desired. In addition to the function performed by the braces 23 in reinforcing the door 21, the inner edges of these braces are adapted to bear against side rails 19ª to which the screen 18 is secured to hold the latter in operative relation to the drum 13, as shown by Fig. 3, there being at least two of the braces 23 used or connected to the door 21.

Having thus fully described the invention, what is claimed, is:

1. In a cotton elevating, cleaning and feeding apparatus, the combination of an upper air chamber, a receiving chamber in direct communication with the air chamber, said receiving chamber being provided with a vertical dividing screen partition to form a rear air space, a cleaning drum at the base of the receiving chamber, means for feeding the cotton from the receiving chamber to the drum, a removable door in rear of the drum, a screen between the rear portion of the drum and the door, the latter having means to engage portions of the screen, an air space being formed in rear of the screen and drum in communication with the air space in rear of the receiving chamber, an outlet in front of the drum, and a suction box below the drum and having communication with the said air spaces.

2. In a cotton elevating, cleaning and feeding apparatus, the combination of an upper air chamber having a suction pipe connected thereto, a receiving chamber immediately below the air chamber and in vertical alinement with the latter, a screen partition forming the rear wall of the receiving chamber and providing an adjacent air space, a cleaning drum at the lower termination of the receiving chamber, feeding means interposed between the drum and the receiving chamber, a removable door in rear of the drum, a screen movably mounted in rear of the drum and forming an air space between the same and the door, the door having means to bear against portions of the latter screen, which is in communication with the air space above and adjacent to the receiving chamber, a suction box below the cleaning drum, the lower air space communicating with the suction box, and an outlet in advance of the drum and above the suction box.

3. In a cotton elevating, cleaning and feeding apparatus, the combination of a casing provided with an upper air chamber having a conduit communicating therewith, a receiving chamber directly below the air chamber, the rear portion of the casing adjacent to the receiving chamber being inclined rearwardly and downwardly, a screen partition forming the rear wall of the receiving chamber and providing an air space between the same and the rear part of the casing, a cleaning drum rotatably mounted at the lower portion of the receiving chamber, a feed cylinder interposed between the drum and the receiving chamber, an automatically operating check valve or press board adjacent to the feed cylinder and above the drum, a door removably mounted in the casing in rear of the drum and provided with inwardly projecting engaging means, a movable screen in rear of the drum and having an air space between the same and the door and in communication with the air space above, a lower suction box in communication with the lower air space, and an outlet in advance of the drum and opposite movable screen.

4. In a cotton elevating, cleaning and feeding apparatus, the combination with a cleaning drum, of a receiving chamber above the same, a screen movably disposed in rear of the drum, a casing in rear of the screen having a door therein to render said screen accessible, the door having devices adapted to bear against portions of the screen to hold the latter in place, the screen being movable through the opening for the door when the latter is removed, and suction creating means coöperating with the drum.

5. In a cotton elevating, cleaning and feeding apparatus, the combination of a casing having an upper air chamber provided with a suction conduit in communication therewith, a receiving chamber immediately below the air chamber, the rear portion of the casing adjacent to the receiving chamber being inclined downwardly and rearwardly, a screen partition forming the rear wall of the receiving chamber and an air space between the same and the adjacent part of the casing, a cleaning drum having flexible strips on the ends thereof engaging the casing, a screen in rear of the drum, feeding means interposed between the receiving chamber and drum, an air space being provided in rear of the screen adjacent to the drum and in communication with the air space in rear of the partition screen, a suction box below the drum with which the lower space has communication, and an outlet in advance of the drum and above the suction box.

6. In a cotton elevating, cleaning and feeding apparatus, the combination of a casing, a cleaning drum having blades and teeth alternately projecting from the periphery thereof and also provided with flexible strips on the ends thereof engaging the casing, a receiving chamber above the drum, a screen and air space in rear of the drum, a suction box with which the air space communicates, and an outlet in advance of the drum above the suction box.

7. In an apparatus for elevating, cleaning and feeding cotton, the combination of a casing having a receiving chamber, a cleaning drum rotatably mounted at the base of said chamber, an outlet in advance of the drum, a suction box below the drum, and feed controlling devices between the drum and receiving chamber, one of said devices being in the form of an automatically operating hinged valve or press board provided with means for returning it to normal position, and the other of said devices being in the form of a toothed wheel, the teeth of which are adapted to engage the said valve.

8. In a cotton elevating, cleaning and feeding apparatus, the combination of a receiving chamber, a cleaning drum at the base of the chamber, an outlet in advance of the drum, a suction box below the drum having a trunk, an upwardly opening relief valve in the top portion of the trunk and having resilient means adjustably connected thereto for causing a self-closing movement of the said valve, and a suction fan having connection with the trunk at a distance from the valve.

9. In a cotton elevating, cleaning and feeding apparatus, the combination of an upper air chamber having a suction conduit means communicating therewith, receiving chambers below and communicating with the said air chamber, the receiving chambers being divided by screen partitions to form air spaces in rear thereof, cleaning drums at the bases of the receiving chambers, the air spaces continuing downwardly in rear of the said drums, movable arcuate screens disposed in rear of the drums, outlets in advance of the drums, removable doors in rear of the screens having means to engage portions of the latter, feeding means between the drums and receiving chambers, and a lower suction box with which the air spaces communicate.

10. In a cotton elevating, cleaning and feeding apparatus, the combination of a receiving chamber, a cleaning drum at the base of the receiving chamber, a feeding cylinder interposed between the drum and the receiving chamber, a driving pulley for the drum carrying a pinion, an adjustable spur gear to coöperate with the said pinion, a movable bracket arm on which said spur gear is mounted, a lever for adjusting the said bracket arm, a ratchet wheel keyed to the shaft of the feeding cylinder, arms radially projecting from the shaft of the feeding cylinder and having pawls fulcrumed on their outer extremities and held in engagement with the ratchet wheel, and connecting rods eccentrically attached to the same point on the said spur gear and adjustably connected to intermediate portions of the arms.

11. In a cotton elevating, cleaning and feeding apparatus, the combination of a receiving chamber, a cleaning drum at the base of the chamber, an outlet in advance of the drum, a suction box below the drum having a trunk connected thereto, an automatically operating relief valve in the upper portion of the trunk, a diagonal screen under the valve, a hopper-shaped outlet below the screen, and a suction fan connected to the trunk at a distance from the valve.

In testimony whereof I have hereunto set my hand in presence of two subscribing witnesses.

ALBERT F. TIDWELL.

Witnesses:
V. L. PATRICK,
F. H. TURBEVILLE.